Patented Apr. 6, 1954

2,674,530

UNITED STATES PATENT OFFICE 2,674,530

MANUFACTURE OF LOW-CARBON STAINLESS STEEL

Herman P. Rassbach, Winnetka, Ill., assignor to Union Carbide and Carbon Corporation, a corporation of New York No Drawing. Application June 6, 1952,
Serial No. 292,192

6 Claims. (Cl. 75—12)

This invention relates to a process for finishing low-carbon, chromium-containing steels in an electric arc furnace and has been found to be particularly useful in the manufacture of those stainless steels having a carbon content of not more than 0.03%.

Low-carbon, chromium-containing steels are made for the most part in an electric arc furnace having carbonaceous electrodes. According to the conventional practice, a charge of carbon steel scrap and chromium-containing material such as stainless steel scrap is melted in the furnace under a slag. The molten steel is decarburized, preferably with oxygen, until the steel has a carbon content of as low as about 0.015%. The slag, after the decarburization step, generally contains a high proportion of metallic oxides, for example chromium oxide, and at least a part of these oxides may be reduced and the metallic constituents recovered by the addition of a silicon or aluminum-bearing reagent. Alternatively, the slag may be discarded after the decarburization step and a new slag formed for the finishing operation. The steel is deoxidized, suitably at the time of the reduction of the slag, by the addition to the steel of deoxidation agents. If necessary, the composition of the steel is adjusted, either simultaneously with or following the reduction of the slag and deoxidation of the metal, with low-carbon alloying materials, such as ferrochromium and ferrochrome-silicon. The steel is finished by holding it, under the finishing slag, until the alloying constituents are melted and uniformly distributed through the steel and the amount of impurities is reduced to an acceptable minimum.

The process described in general terms above can be carried out in a furnace having an acidic, basic or neutral lining. A slag which is either substantially more basic or more acid than the lining of the furnace will attack and erode the lining. In practice it is customary to use an acidic slag with an acid lining and a basic slag with a basic lining to minimize the damage to the lining. Because of certain advantages of the basic furnace, such as increased chromium recovery, the use of a basic lining and a basic slag are favored in the production of low-carbon stainless steels.

One of the most troublesome problems encountered in the manufacture of low-carbon stainless steels in a basic lined furnace under a basic slag is that of the tendency of the carbon content of the steel to increase during the finishing operation. When a maximum of 0.03%, or even 0.06%, carbon is permissible in the steel, only a very slight increase in the carbon content can be tolerated.

When an acidic lining and an acidic slag are used in the manufacture of low-carbon steel, the increase in the carbon content during the finishing of the steel is not a serious matter. However, the recovery of scarce and expensive alloying metals, such as chromium, is not as good with the acid slag as it is with the basic slag.

The principal object of the invention is to provide a process for finishing low-carbon, chromium-containing steels having the advantages realized with both the basic and acidic slags.

More specifically, the object of the invention is to provide a process for the finishing of low-carbon, chromium-containing steels with which the increase in the carbon content of the steel is minimized and the recovery of alloying elements, particularly chromium, is high.

The objects of the invention are accomplished by providing a basic slag in an electric furnace having a basic lining and consumable carbonaceous electrodes and maintaining an acid slag condition immediately below the electrodes during the finishing operation. The basic condition of the body of the slag renders it compatible with the basic furnace lining and insures the recovery of a high proportion of the chromium and other alloying elements from the slag. The acid condition of the slag immediately below the electrodes retards the transfer of carbon to the slag and ultimately to the steel, thus minimizing the increase in carbon content of the steel.

In the conventional process for making low-carbon, chromium-containing steels, the principal constituents of the slag are silica, lime, magnesia, alumina and fluorspar. Of these constituents, silica, lime, and magnesia, depending upon the proportions in which they are present, impart to the slag its acidic or basic properties. Alumina is presumed to be neutral and fluorspar is generally present in only minor amounts. The basic-acid ratio of a slag is determined by dividing the weight of base-forming constituents, lime and magnesia, in the slag by the weight of the acid-forming constituent, silica, in the slag. The ratio can be expressed as follows:

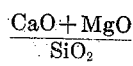

Conventionally, in the manufacture of chromium-containing steels a basic slag having a base-acid ratio of about 2.0 is preferred.

In the practice of the invention, a molten bath of steel is formed in an electric arc furnace having consumable carbonaceous electrodes and a basic lining. After the steel is decarburized, the composition of the slag is adjusted if necessary so that the base-acid ratio of the slag is about 2.0. Then in the finishing operation silica is introduced under each of the electrodes in an amount sufficient to reduce the base acid ratio of the slag immediately below the electrode to between 0.7 and 1.6. Chromium or other alloying materials are dissolved in the steel while the slag is maintained within the specified limits. The silica added under the electrodes diffuses very slowly and mixes with the body of the slag. Thus, the base-acid ratio of the slag generally and particularly that part of the slag in contact with the lining is decreased only to very slight degree during the time required to finish the steel.

The process will be described more in detail in the following example with respect to the manufacture of a stainless steel containing a maximum of 0.03% carbon. It will be understood that the example is illustrative rather than limiting. The process of the invention can be advantageously used in manufacturing other low-carbon, chromium-containing steels, such as 0.06% maximum carbon stainless steel, in the manufacture of which the increase of the carbon content of the steel during the finishing operation presents a serious problem.

A stainless steel having a maximum carbon content of 0.03% was prepared as follows: A twenty-five ton heat of low carbon, 18% chromium, 8% nickel stainless steel was prepared by melting steel scrap containing nickel in an electric arc furnace having a basic lining. The necessary proportions of silica, lime, and magnesia were present in the charge to form a basic slag having a base-acid ratio of about 2.0 when the charge was melted. The steel was decarburized by blowing oxygen through it until a carbon content of below about 0.02% was obtained. Ferrochromium containing about 5% silicon was then added to the heat in an amount of about 13,000 pounds representing an addition of about 17% chromium to the steel. Immediately thereafter an addition of about 125 pounds of silica and 35 pounds of manganese ore was made under each electrode. This addition was adequate to establish a base-acid ratio of the slag underneath the electrode of between 0.7 and 1.6. The carbon content of the finished steel was not substantially above 0.02% and well below 0.03%. The amount of chromium in the slag was relatively low.

The amount of acid-forming material, such as silica, to be added underneath the electrodes will depend to an extent upon the base-acid ratio of the body of the slag. The calculation of the amount required for a particular heat will be well understood by those skilled in the art. The acid-forming constituents so added will, of course, slowly diffuse and lower the base-acid ratio of the body of the slag so the addition of an excess of the acid-forming constituent should be avoided.

It will be understood that changes in the process, such as starting with a charge containing no chromium and adding all of the chromium during the finishing step, can be made without departing from the practice of the invention.

What is claimed is:

1. In the process of manufacturing low-carbon, chromium-containing steel which comprises preparing a molten bath of steel in an arc furnace having carbonaceous electrodes and a basic lining, adjusting the carbon content of said steel and finishing said steel by dissolving alloying elements therein, the improvement in the finishing of said steel which comprises dissolving in the steel alloying materials including chromium under a body of basic slag while maintaining a base-acid ratio of from 0.7 to 1.6 in the slag immediately below the furnace electrodes.

2. In the process of manufacturing low-carbon, chromium-containing steel which comprises preparing a molten bath of steel in an arc furnace having carbonaceous electrodes and a basic lining, adjusting the carbon content of said steel and finishing said steel by dissolving alloying elements therein, the improvement in the finishing of said steel which comprises dissolving in the steel alloying materials including chromium under a body of basic slag having a base-acid ratio of at least about 2.0 while maintaining a base-acid ratio of from 0.7 to 1.6 in the slag immediately below the furnace electrodes.

3. In the process of manufacturing low-carbon, chromium-containing steel having a maximum carbon content of 0.03% which comprises preparing a molten bath of steel in an arc furnace having carbonaceous electrodes and a basic lining, adjusting the carbon content of said steel to a maximum of 0.03% and finishing said steel by dissolving alloying elements therein, the improvement in the finishing of said steel which comprises dissolving in the steel alloying materials including chromium under a body of basic slag while maintaining a base-acid ratio of from 0.7 to 1.6 in the slag immediately below the furnace electrodes.

4. In the process of manufacturing low-carbon, chromium-containing steel having a maximum carbon content of 0.03% which comprises preparing a molten bath of steel in an arc furnace having carbonaceous electrodes and a basic lining, adjusting the carbon content of said steel to a maximum of 0.03% and finishing said steel by dissolving alloying elements therein, the improvement in the finishing of said steel which comprises dissolving in the steel alloying materials including chromium under a body of basic slag having a base-acid ratio of at least about 2.0 while maintaining a base-acid ratio of from 0.7 to 1.6 in the slag immediately below the furnace electrodes.

5. In the process of manufacturing chromium-containing steel having a maximum carbon content of 0.03% which comprises preparing a molten bath of steel in an arc furnace having carbonaceous electrodes and a basic lining, adjusting the carbon content of said steel to a maximum of 0.03% and finishing said steel by dissolving alloying elements therein, the improvement in the finishing of said steel which comprises adding low carbon ferrochromium to the steel, maintaining a basic slag over said steel while introducing silica immediately below the furnace electrodes in an amount sufficient to make the base-acid ratio of the slag immediately below said electrodes between 0.7 and 1.6, and dissolving said ferrochromium in said steel under said basic slag.

6. In the process of manufacturing chromium-containing steel having a maximum carbon content of 0.03% which comprises preparing a molten bath of steel in an arc furnace having carbonaceous electrodes and a basic lining, adjusting the carbon content of said steel to a maximum of 0.03% and finishing said steel by dissolving alloying elements therein, the improvement in the finishing of said steel which comprises adding low carbon ferrochromium to the steel, maintaining a basic slag having a base-acid ratio of at least about 2.0 over said steel while introducing silica immediately below the furnace electrodes in an amount sufficient to make the base-acid ratio of the slag immediately below said electrodes between 0.7 and 1.6, and dissolving said ferrochromium in said steel under said basic slag.

References Cited in the file of this patent

UNITED STATES PATENTS

| Number | Name | Date |
|---|---|---|
| 2,458,651 | Schulz | Jan. 11, 1949 |

OTHER REFERENCES

Electric Furnace Proceedings, vol. 9, 1951, pages 104, 105 and 106. Published by the American Institute of Mining and Metallurgical Engineers, New York.